United States Patent
Villagomez et al.

(10) Patent No.: US 9,245,378 B1
(45) Date of Patent: Jan. 26, 2016

(54) SURFACE DATA GENERATING SYSTEM, DEVICE, AND METHOD

(71) Applicants: Victor E. Villagomez, Cedar Rapids, IA (US); Travis S. Vanderkamp, Marion, IA (US); Christopher A. Scherer, Cedar Rapids, IA (US)

(72) Inventors: Victor E. Villagomez, Cedar Rapids, IA (US); Travis S. Vanderkamp, Marion, IA (US); Christopher A. Scherer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 332 days.

(21) Appl. No.: 13/744,736

(22) Filed: Jan. 18, 2013

(51) Int. Cl.
*G06T 15/80* (2011.01)

(52) U.S. Cl.
CPC ..................... *G06T 15/80* (2013.01)

(58) Field of Classification Search
CPC .... G01C 23/005; G01C 23/00; G08G 5/0021; G06T 15/80
See application file for complete search history.

(56) References Cited

U.S. PATENT DOCUMENTS

| | | | |
|---|---|---|---|
| 2007/0005199 A1* | 1/2007 | He | 701/16 |
| 2010/0250030 A1* | 9/2010 | Nichols et al. | 701/7 |
| 2012/0245902 A1* | 9/2012 | Li | G01C 21/32 703/1 |

* cited by examiner

*Primary Examiner* — Xiao Wu
*Assistant Examiner* — Chong Wu
(74) *Attorney, Agent, or Firm* — Angel Gerdzhikov; Donna Suchy; Daniel Barbieri (57) ABSTRACT

Present novel and non-trivial system, device, and method for generating surface data are disclosed. An image generator is configured to receive navigation data; retrieve first surface data representative of a plurality of elevations; retrieve second surface data representative of location and elevation information (and possibly dimensions and the locations of at least one surface feature) of at least one reference point; determine shading data as a function of the first surface data; modify the first surface data as a function of the second surface data; and generate image data as a function of the modified first surface data and the shading data, where the image data is representative of a three-dimensional perspective of a scene outside a vehicle comprised of at least one flattened surface feature area having one elevation and to which the shading represented in the shading data is applied.

19 Claims, 10 Drawing Sheets

SURFACE DATA GENERATING SYSTEM, DEVICE, AND METHOD

BACKGROUND OF THE INVENTION

1. Field of the Invention

This invention pertains generally to the field of synthetic vision systems such as, but not limited to, those employed in aircraft display systems.

2. Description of the Related Art

The synthetic vision system ("SVS"), enhanced vision system ("EVS"), and combined enhanced-synthetic vision system ("EVS-SVS") are used to present to pilots of aircraft with egocentric, three-dimensional perspective images of the scene outside the aircraft. With respect to the SVS and EVS-SVS, the image may be generated using a terrain database that could also been employed by terrain awareness and warning system (TAWS") meeting the standards published by the Federal Aviation Administration in a Technical Standard Order ("TSO") known as TSO-C151 b.

Another database that could be employed in aircraft is airport database comprised of one or more airport mapping databases configured to store, in part, data representative of an elevation and location of an airport or aerodrome reference point and data representative of dimensions and locations of surface features such as, but not limited to, runways, helipads, taxiways, frequency areas, aprons, parking areas, and vertical structures located within an area defined as an airport and/or aerodrome. One such example of such airport database is described in industry standards published by Aeronautical Radio, Inc. ("ARINC") and/or Radio Technical Commission for Aeronautics ("RTCA") such as, but not limited to, ARINC Specification 816 entitled "Embedded Interchange Format for Airport Mapping Database" and RTCA DO-272A entitled "User Requirements for Aerodrome Mapping Information."

Because the TAWS and ARINC 816 databases have been developed for different purposes, the use of both in combination of one another is not conducive when generating an egocentric, three-dimensional perspective image. Where the TAWS database is generally populated with terrain elevation values of a plurality of terrain cells, the ARINC 816 database is generally populated with one elevation value per airport. When an egocentric image of an airport is generated using data retrieved from a TAWS database, an image of a terrain surface that is neither flat nor even is typically produced because the real terrain on which an actual airport sits is comprised of a plurality of elevation values; however, when an egocentric image of an airport is generated using data retrieved from an ARINC 816 database, a terrain surface that is flat and even is generally produced because there is one elevation value. If a plurality of elevations are retrieved from the TAWS database and included with the surface features retrieved from the ARINC 816 database in the generation of the image, a loss of surface features could result.

BRIEF SUMMARY OF THE INVENTION

The embodiments disclosed herein present novel and non-trivial system, device, and method generating surface data. With the embodiments disclosed herein, terrain data retrieved from one source may be modified with surface feature data retrieved from a second source to present an egocentric, three-dimensional perspective image of the surface without a loss of surface features.

In one embodiment, a system for generating surface data is disclosed. The system may be comprised of a source of navigation data, a source of first surface data, a source of second surface data, and an image generator configured to generate image data. In an additional embodiment, the system could be comprised of a display system configured to present the image represented in the image data on the screen of one or more display units.

In another embodiment, a device for generating surface data is disclosed. The device may be comprised of an image generator configured to perform the method discussed in the following paragraph. As embodied herein, the image generator could be comprised of one or more processing units configured or programmed to the generate image data.

In another embodiment, a method for generating surface data is disclosed. The method could be comprised of receiving navigation data representative of at least location information, retrieving first surface data based upon the navigation data, retrieving second surface data based upon the navigation data, determining shading data as a function of the first surface data, modifying the first surface data as a function of the second surface data, and generating image data as a function of the modified first surface data and the shading data. The first surface data could be representative of a plurality of elevations; the second surface data could be representative of at least location and elevation information of at least one reference point; and the shading data could be representative of shading corresponding to the first surface data. The image data could be representative of a three-dimensional perspective of a scene outside a vehicle comprised of at least one flattened surface feature area having one elevation and to which the shading represented in the shading data is applied. In an additional embodiment, the method could be further comprised of providing the image data to the display system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
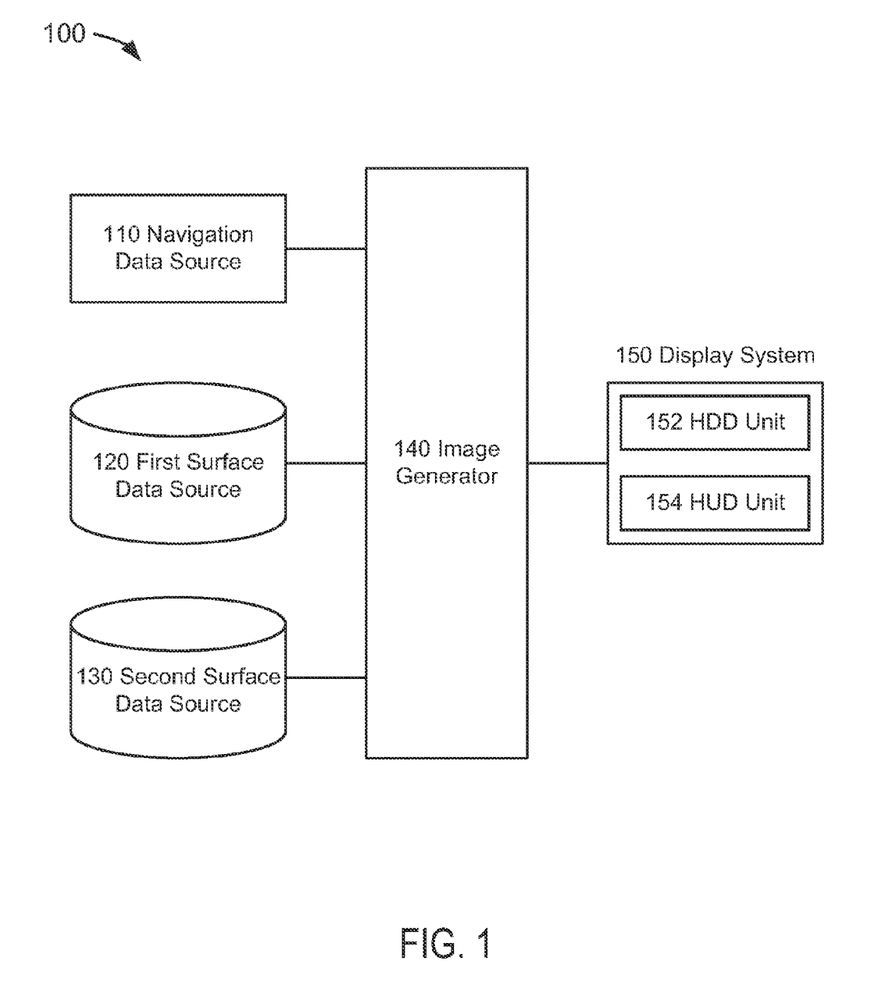
FIG. 1 depicts a functional block diagram of a system for generating surface data.

FIG. 1 depicts a functional block diagram of a surface data generating system 100 suitable for implementation of the techniques described herein. The functional blocks of the system may include a navigation data source 110, a first surface data source 120, a second surface data source 130, an image generator ("IG") 140, and a display system 150.

In an embodiment of FIG. 1, the navigation data source 110 may be comprised of one or more systems for acquiring and providing navigation data to any vehicular system requiring an input of navigation data. As embodied herein, data could be comprised of any analog or digital signal, either discrete or continuous, which could contain information. As embodied herein, signals are synonymous with data. In addition, vehicle could mean any manned or unmanned vehicle which is able to operate or the ground or fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water. Although the following discussion will be drawn towards an aircraft, the embodiments disclosed herein are not limited to such vehicle.

In an embodiment of FIG. 1, the navigation data source 110 could be comprised of a system or systems that provide navigation data information in an aircraft. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position 112, altitude 114, heading 116, and attitude 118. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the IG 140 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft and/or receiving and storing flight plan information such as, but not limited to, the identification of the runway of intended landing (i.e., a surface of interest).

In an embodiment of FIG. 1, the first surface data source 120 could be comprised one or more sources of object data that could be comprised of terrain data and/or surface feature data of widespread areas. The first surface data source 120 could be comprised of, but not limited to, a terrain database configured to store terrain data contained in digital elevation models ("DEM"). Generally, the terrain data of a DEM are stored as grids, and each grid represents an area of terrain and is commonly referred to as a terrain cell. The first surface data source 120 could be a database configured to store data representative of a plurality of elevations of surface features such as, but not limited to, obstacles, buildings, lakes and rivers, and paved or unpaved surfaces. For the purposes of illustration and not of limitation, the first surface data source 120 could be comprised of a terrain database employed by a terrain awareness and warning system ("TAWS") meeting the standards published by the Federal Aviation Administration ("F.A.A.") in a Technical Standard Order ("TSO") known as TSO-C151 b.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

In an embodiment of FIG. 1, the second surface data source 130 could be comprised one or more sources of object data that could be comprised of terrain data and/or surface feature data of manmade surface features. The second surface data source 130 could be an airport database comprised of one or more airport mapping databases configured to store, in part, data representative of an elevation and location of an airport or aerodrome reference point and dimensions and locations of surface features such as, but not limited to, runways, helipads, taxiways, frequency areas, aprons, parking areas, and vertical structures located within an area defined as an airport and/or aerodrome. For the purposes of illustration and not of limitation, the second surface data source 130 could be comprised of an airport database such as the database described in industry standards published by Aeronautical Radio, Inc. ("ARINC") and/or Radio Technical Commission for Aeronautics ("RTCA") such as, but not limited to, ARINC Specification 816 entitled "Embedded Interchange Format for Airport Mapping Database" and RTCA DO-272A entitled "User Requirements for Aerodrome Mapping Information." The second surface data source 130 could also be comprised of a navigation database such as the database described in the industry standard published by ARINC such as, but not limited to, ARINC Specification 424 entitled "Navigation Systems Data Base." As embodied herein, the first surface data source and the second surface data source could be comprised of the same data source. First surface data source 120 and second surface data source 130 are data sources known to those skilled in the art.

In an embodiment of FIG. 1, the IG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IG 140 could be a processor(s) used by or in conjunction with any other system of the aircraft including, but not limited to, the navigation data source 110, the first surface data source 120, the second surface data source 130, and the display system 150, or any combination thereof.

The IG 140 may be programmed or configured to receive as input data representative of information obtained from various systems and/or sources including, but not limited to, the navigation data source 110, the first surface data source 120, and the second surface data source 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IG 140 may be programmed or configured to execute one or both of the methods discussed in detail below. The IG 140 may be programmed or configured to provide output data to various systems and/or units including, but not limited to, the display system 150.

In an embodiment of FIG. 1, the display system 150 may include, but are not limited to, one or more tactical display unit(s) comprising an HDD unit 152 and/or a HUD unit 154. An HDD unit 152 and/or a HUD unit 154 may display image from data produced by one or more vision systems such as, but not limited to, a synthetic vision system ("SVS"), an enhanced vision system ("EVS"), or a combined SVS-EVS. An HDD unit 152 is typically a unit mounted to an aircraft's flight instrument panel located in front of a pilot and below the windshield and the pilot's field of vision, and a HUD unit 154 provides tactical information to the pilot or flight crew, in the pilot's forward field of view through the windshield, eliminating transitions between head-down and head-up flying.

The display system 150 may include a vision system (not shown) which generates image data which represents the image displayed on the visual display unit 142. Vision systems could include, but are not limited to, a synthetic vision system ("SVS"), an enhanced vision system ("EVS"), and/or a combined SVS-EVS.

Figure 2:
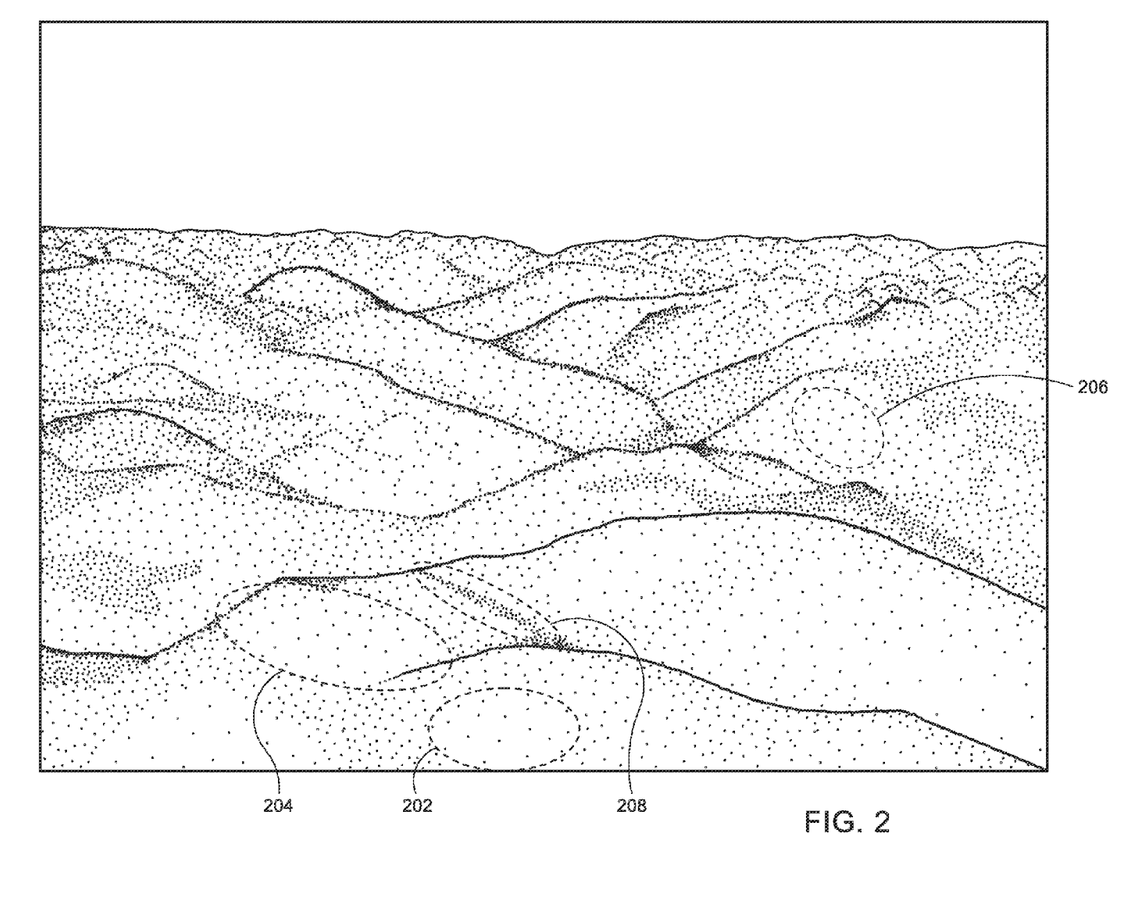
FIG. 2 depicts the use of shading effects to illustrate an image of a scene outside the aircraft.
Figure 3:
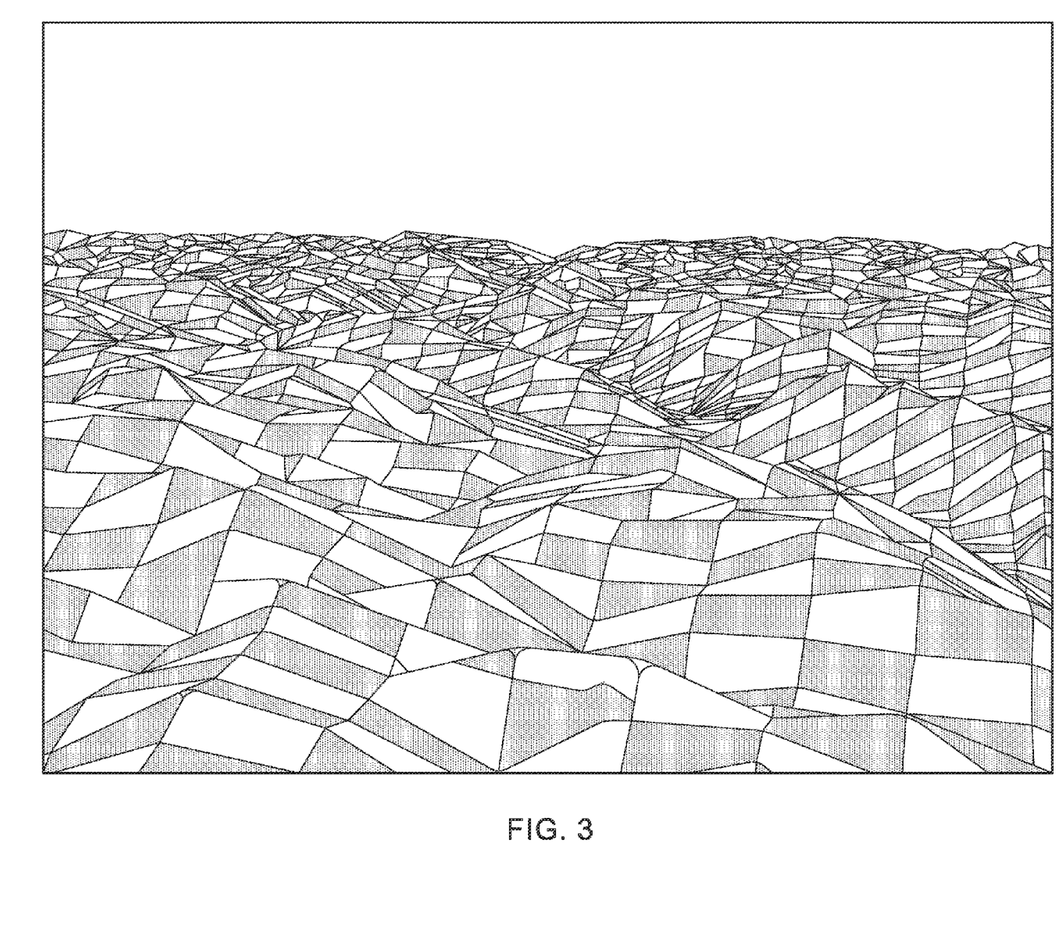
FIG. 3 depicts the use of texturing effects to illustrate an image of a scene outside the aircraft.
Figure 4:
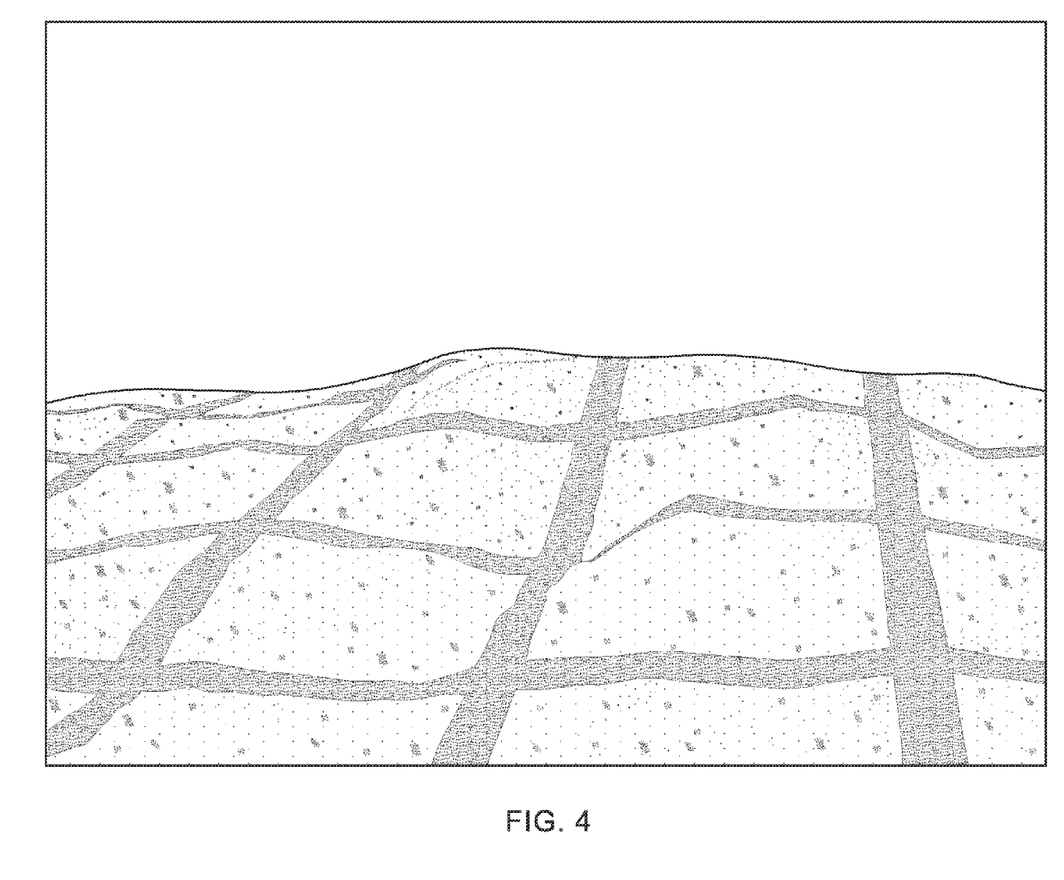
FIG. 4 depicts the use of texturing effects to illustrate a second image of a scene outside the aircraft.

The drawings of FIGS. 2 through 4 depict exemplary illustrations of images of scenes outside the aircraft that could be generated by the IG 140 and presented on the HDD unit 152 and/or the HUD unit 154. As shown in these images, the terrain is uneven and could indicate of the use of a plurality of terrain elevations of a plurality of terrain cells retrieved from the first surface data source 120. The use of shading effects and texturing effects such as those discussed by VanDerKamp et al in U.S. Pat. No. 8,264,498 entitled "System, Apparatus, and Method for Presenting a Monochrome Image of Terrain on a Head-Up Display Unit" is evident.

Referring to FIG. 2, the use of shading effects is evident. Known to those skilled in the art, shading effects may be determined as a function of a shader algorithm employing one or more factors such as, but not limited to, the type of light source, angle of light source to terrain of the terrain model, distance falloff, and advanced lighting techniques. For example, light sources could fall into one category including, but not limited to, directional light, point light, spotlight, and area light. The angle of the light source could vary with changes in terrain elevation or the rate of change of terrain, i.e., density of terrain contours. An increase or decrease in the elevation of terrain in the scene outside the aircraft might cause the angle of light source (assumed to be located behind the aircraft) to change with respect to the surface of the terrain. For example, an increase of terrain elevation could result with lighter shading and/or greater intensity of a color(s) being generated due to a decrease of the angle of the light source striking the surface of the terrain; likewise, a decrease of terrain elevation could result with darker shading and/or lesser intensity of a color(s) being generated because of an increase of the angle striking the surface of the terrain. Distance falloff is a technique where shading becomes darker as the distance from a light source becomes greater; the employment of such technique could produce a more realistic image. Advanced lighting techniques could include those which have been created to produce smooth shading including, but are not limited to, Gouraud shading and Phong shading techniques.

One example of a shading effect embodied herein could be the positioning of a light source. In FIG. 2, a light source has been configured as originating from behind the aircraft. With the use of shading effect, the faces of the mountainous terrain that have the steepest increase in elevation (i.e., greatest rate of change in elevation per a given horizontal distance) such as the terrain of item 202 may be depicted with the lightest shade of a color; likewise, the faces which level off at a top such as shown as item 208 (as well as the other ridgelines depicted in FIG. 3) may be depicted with the darkest shade of the color. In between these extremes, other shades of the color may correspond to additional rates of change of terrain as shown by items 204 and 206. As embodied herein, the IG 140 may be programmed to generate a plurality of color(s), shade(s), and/or color intensities corresponding to the shading effects as a function the location of a light source.

Another example of a shading effect embodied herein could be the angle of the light source. In the model of FIG. 2, the angle of the light source could have been configured to project a light originating from an angle that is high relative to the ground. Here, the light source could represent a sun positioned at a relatively low angle above the horizon as represented by the numerous shades which, in turn, enhance the clarity depicted of the terrain comprising of mountainous slopes. As embodied herein, an IG 140 may be programmed to generate a plurality of color(s), shade(s), and/or color intensities corresponding to the shading effects as a function of the angle of the light source.

Another example of a shading effect embodied herein could be distance falloff. In the model depicted in FIG. 2, distance falloff could be configured to gradually generate darker shades as the distance from a light source becomes greater. As seen in FIG. 2, the shading gradually increases in darkness between the position of the aircraft and the horizon. That is, the lower portion of the image (and closest terrain in the scene) is generally lighter than the upper portion (and the farthest terrain). As embodied herein, the IG 140 may be programmed to generate a plurality of color(s), shade(s), and/or color intensities corresponding to the shading effects as a function of distance falloff.

Referring to FIGS. 3 and 4, the use of texturing effects is evident. As shown in FIG. 3, one example of a texturing effect embodied herein could be a pattern comprising a regular geometric arrangement of shapes. In an embodiment of FIG.

3, one such arrangement of shapes includes a checkerboard pattern that has been distorted to "fit" the contours of the same terrain model of FIG. 2. In simulator testing, a pattern comprising a regular geometric arrangement of shapes such as a checkerboard pattern or a fishnet pattern of FIG. 4 was found beneficial and advantageous, for such pattern provides sense of motion, distance to terrain, and height above terrain cues to the pilot. While a checkerboard pattern may be a common type of such arrangement, the embodiments are not limited a regular geometric arrangement of shapes having two alternating color(s), shade(s), and/or color intensities.

Texturing effects could include the seemingly random application of specks of various shapes and sizes as shown in FIG. 4. In simulator testing, the addition of specks to a fishnet pattern was found beneficial and advantageous, where the specks provided beneficial cues to the pilot at low altitudes, the fishnet pattern at high altitudes, and a combination of both during a transition between low and high altitudes. As embodied herein, an IG 140 may be programmed to generate a plurality of color(s), shade(s), and/or color intensities corresponding to the texturing effects as a function speckling or a random application of specks.

As embodied herein, the shape comprising a regular geometric arrangement of shapes is not limited to squares but may be any polygon suited for comprising an arrangement. Moreover, the shapes forming a regular geometric arrangement are not limited to closed shapes. For example, a pattern could be represented by solid or hollow polka-dots.

Another texturing effect could include an irregular arrangement of shapes and/or styles. For the purposes of illustration and not of limitation, texturing effects could include an irregular arrangement of shapes and/or styles such as a leopard skin or zebra stripes. As embodied herein, the IG 140 may be programmed to generate a plurality of color(s), shade(s), and/or color intensities corresponding to the texturing effects as a function of an irregular arrangement of shapes and/or styles.

Figure 5A:
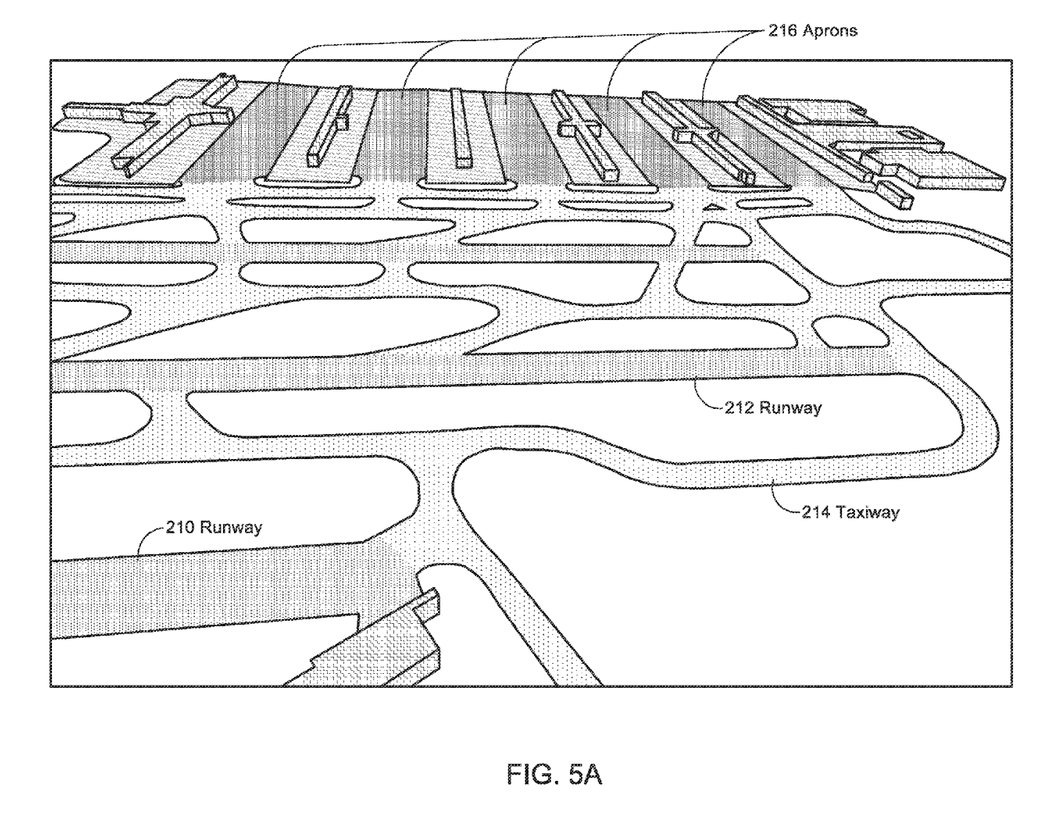
FIG. 5A depicts an illustration of the surface features of an airport generated using surface features and a single elevation value of an airport reference point retrieved from a second source of surface data.

The drawings of FIG. 5 depict exemplary illustrations of an image of surfaces features of an airport located in the scene outside the aircraft that could be generated by the IG 140 and presented on the HDD unit 152 and/or the HUD unit 154. The surface features include runways, taxiways, aprons, and passenger terminals; for the purpose of discussion, attention is drawn to runways 210 and 212, taxiway 214, and aprons 216. As shown in the image of FIG. 5A, the terrain (shown without shading effects or texturing effects) is flat and even which could indicate of the use of a single elevation value of an airport or aerodrome reference point retrieved from the second surface data source 130.

Figure 5B:
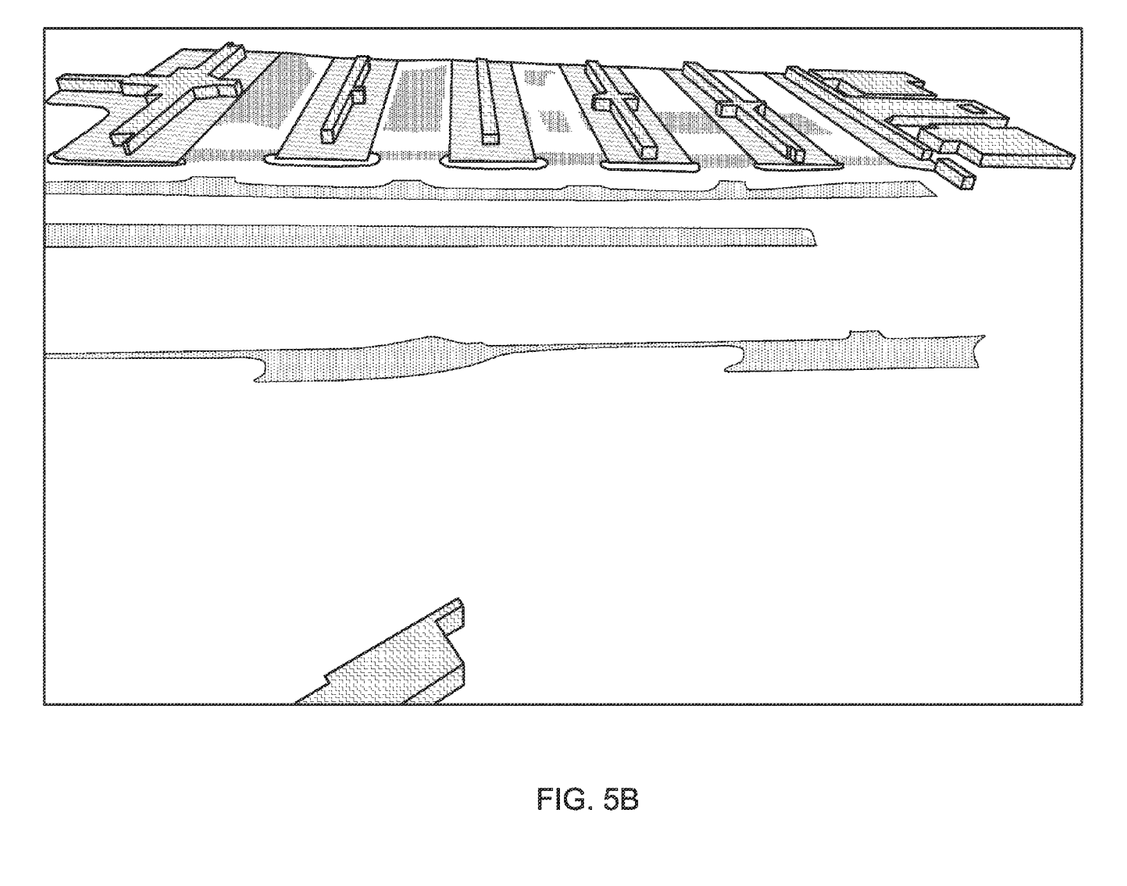
FIG. 5B depicts an illustration of the surface features of the airport in FIG. 5A generated using surface features of the airport retrieved from a second source of surface data and a plurality of elevation values of the terrain from a first source of surface data.

Although the terrain in the image of FIG. 5A is flat and even and generated upon the basis of a single elevation, the real terrain of actual airports is neither flat nor even; however, if a plurality of terrain elevations of a plurality of terrain cells are retrieved from the first surface data source 120 and included with the surface features in the generation of the image, a loss of surface features could result where the value of the terrain elevations of the terrains cells corresponding to the airport are greater than the elevation value of the airport reference point. As shown in FIG. 5B, runway 210 and taxiway 214 have been lost, indicating that the terrain elevation of each surface feature is greater than the airport reference point elevation. Also, portions of runway 212 and the aprons 216 have been lost, indicating that the terrain elevations of these surface features are both greater than and less than the airport reference point elevation, where the terrain elevations of those portions of the surface features that are visible in the image are less than the airport reference point elevation.

Figure 6A:
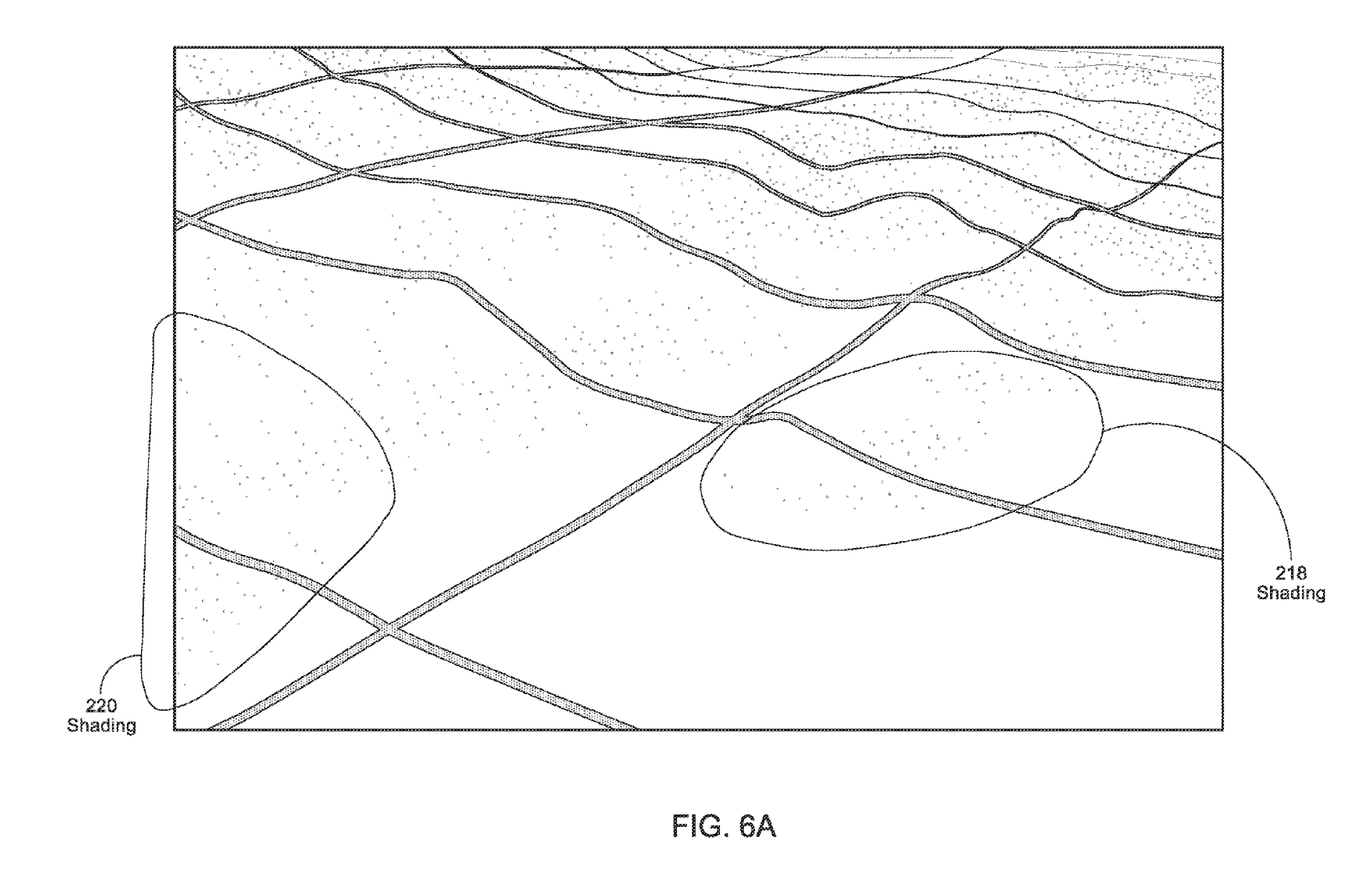
FIG. 6A depicts the use of shading effects and texturing effects to illustrate an image of a scene outside the aircraft generated from a first source of surface data.

The advantages and benefits of the embodiments discussed herein may be illustrated in the drawings of FIG. 6 by showing an example of how shading effects may be determined from one surface data source and employed in an image wherein flat terrain appears. In this example, assume that the IG 140 has retrieved surface data comprised of terrain data representative of a plurality of elevations from the first surface data source 120 and generated image data representative of the image shown in FIG. 6A. Shading effects and the texturing effect comprised of a fishnet have been employed and included in the image data; for the purpose of this example, attention is drawn to shadings 218 and 220.

Once the shading effects have been determined, the IG 140 may retrieve information corresponding to elevation and location (e.g., latitude/longitude) information of the airport reference point from the second surface data source 130. If the second surface data source 130 is comprised of an ARINC 816 database, this information could correspond to "lat", "long", and "elev" attributes of an "Airport Entry" element; if the second surface data source 130 is comprised of an ARINC 424 database, this information could correspond to "Airport Reference Pt. Latitude", "Airport Reference Pt. Longitude", and "Airport Elevation" fields of an "Airport Record." In addition, the IG 140 may retrieve information corresponding to boundary information of the airport which defines a surface feature area within which surface features are defined; if the second surface data source 130 is comprised of an ARINC 816 database, this information could correspond to "minx", "miny", "maxx", and "maxy" attributes of the "Airport Entry" element providing projected western, southern, eastern, and northern coordinates, respectively, relative to the airport reference point. With the location of the airport reference point known, the surface feature area may be determined by the IG 140. Then, the plurality of elevations retrieved from the first surface data source 120 and located with the surface feature area may be modified to the elevation of the airport reference point.

Figure 6B:
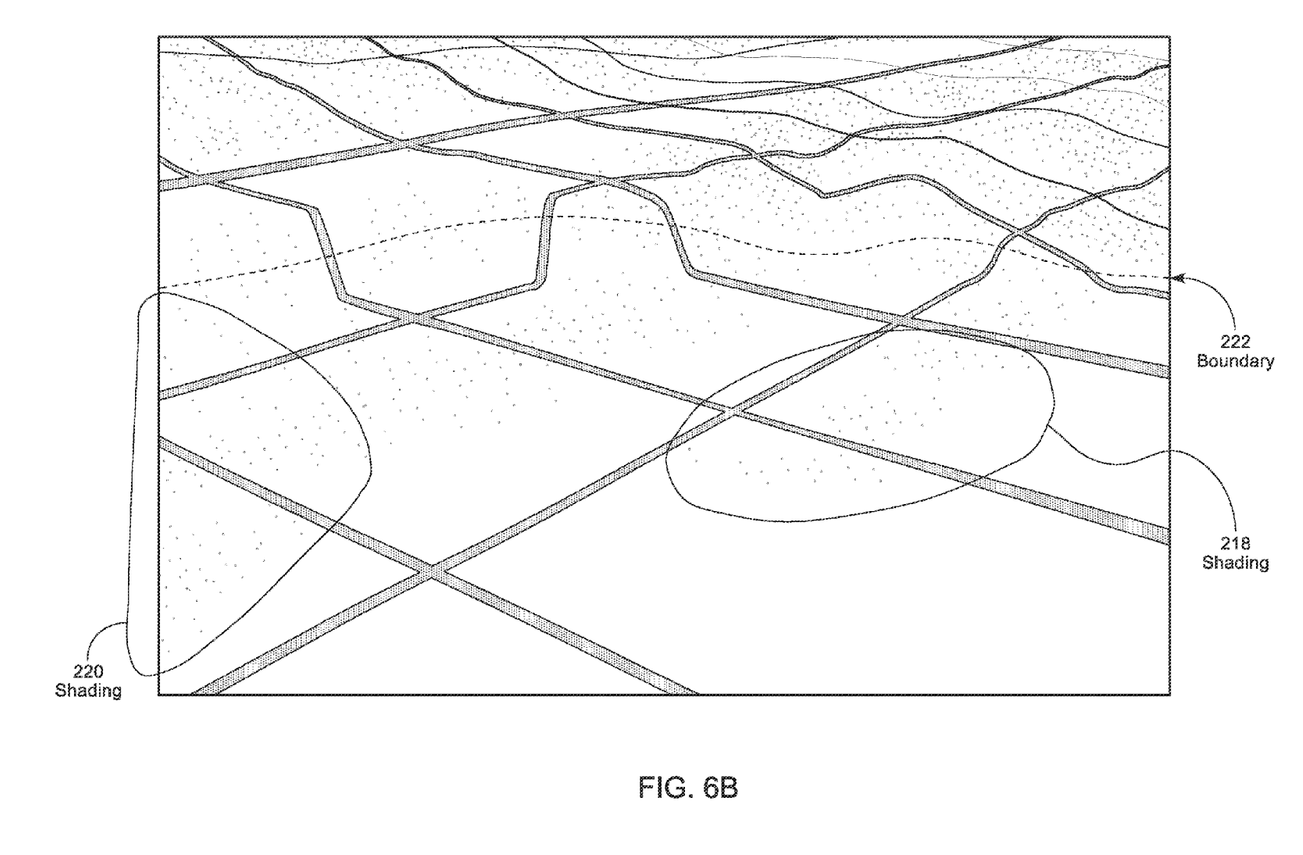
FIG. 6B depicts the use of shading effects and texturing effects to illustrate an image of a scene (inclusive of a flattened surface feature area within which shading has been applied) generated from the first and second sources of surface data.

Referring to FIG. 6B, assume the IG 140 has determined that the surface feature area is the area in the image appearing below the boundary 222. As indicated by the fishnet texturing indicative of flattened terrain, each elevation of the plurality of elevations within the surface feature area have been modified to one elevation; however, the shading effects of the entire image (including shadings 218 and 220 falling within the surface feature area) have not been modified.

Figure 6C:
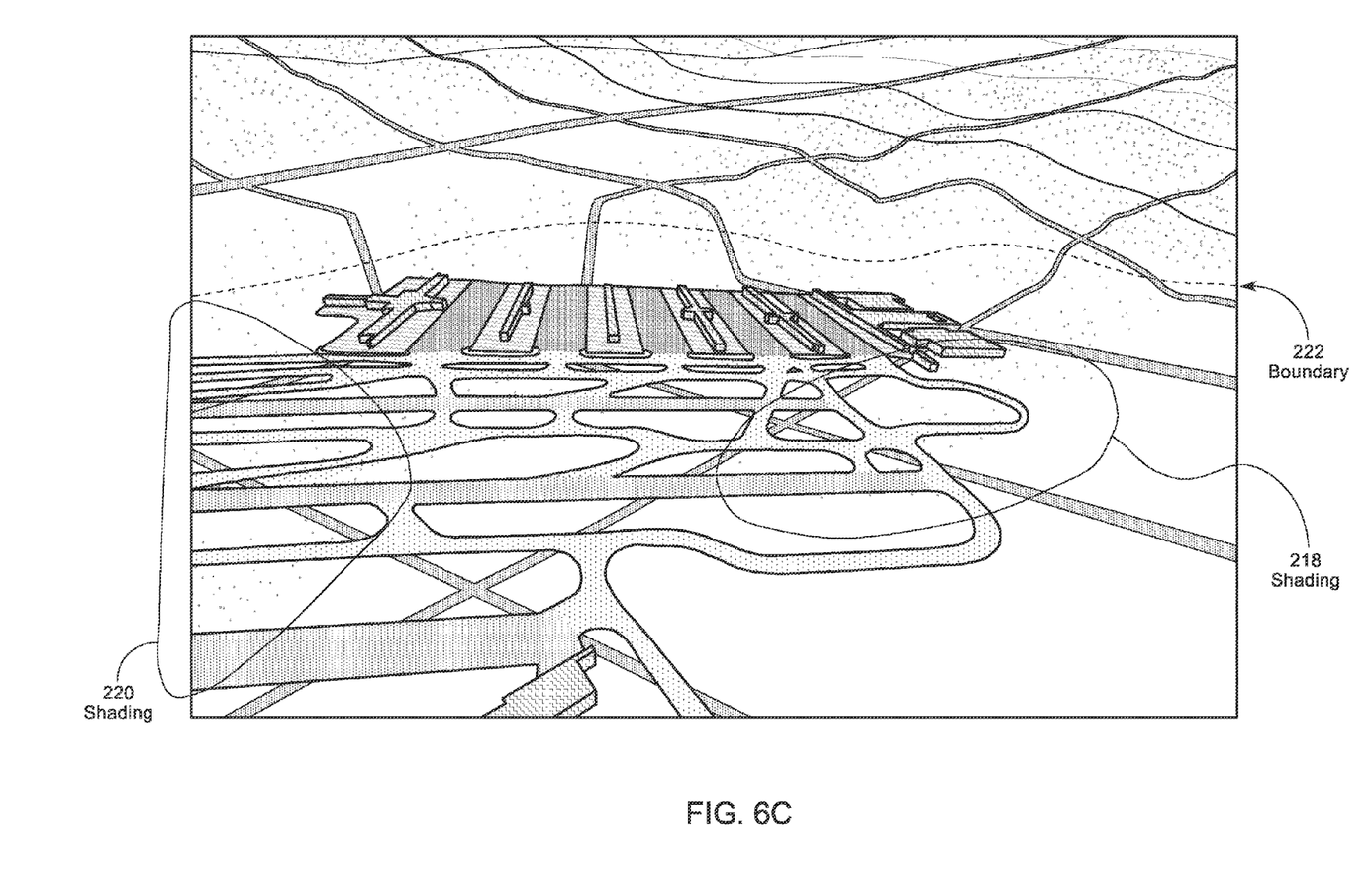
FIG. 6C depicts FIG. 6B with the addition of surface features to illustrate an image of a scene in which the surface features have been included within the flattened surface feature area.

Using the modified terrain scene of FIG. 6B, the IG 140 may retrieve surface feature data from the second surface data source 130 and include the surface features represented in the surface feature data in the image as shown in FIG. 6C (where the surface features are those shown in FIG. 5A). As shown in FIG. 6C, the shading effects of the entire image (including shadings 218 and 220 falling within the surface feature area) have been preserved. Because the plurality of elevations falling inside the surface feature area has been reduced to one elevation, the surface features are not lost (unlike those of FIG. 5B).

Figure 7:
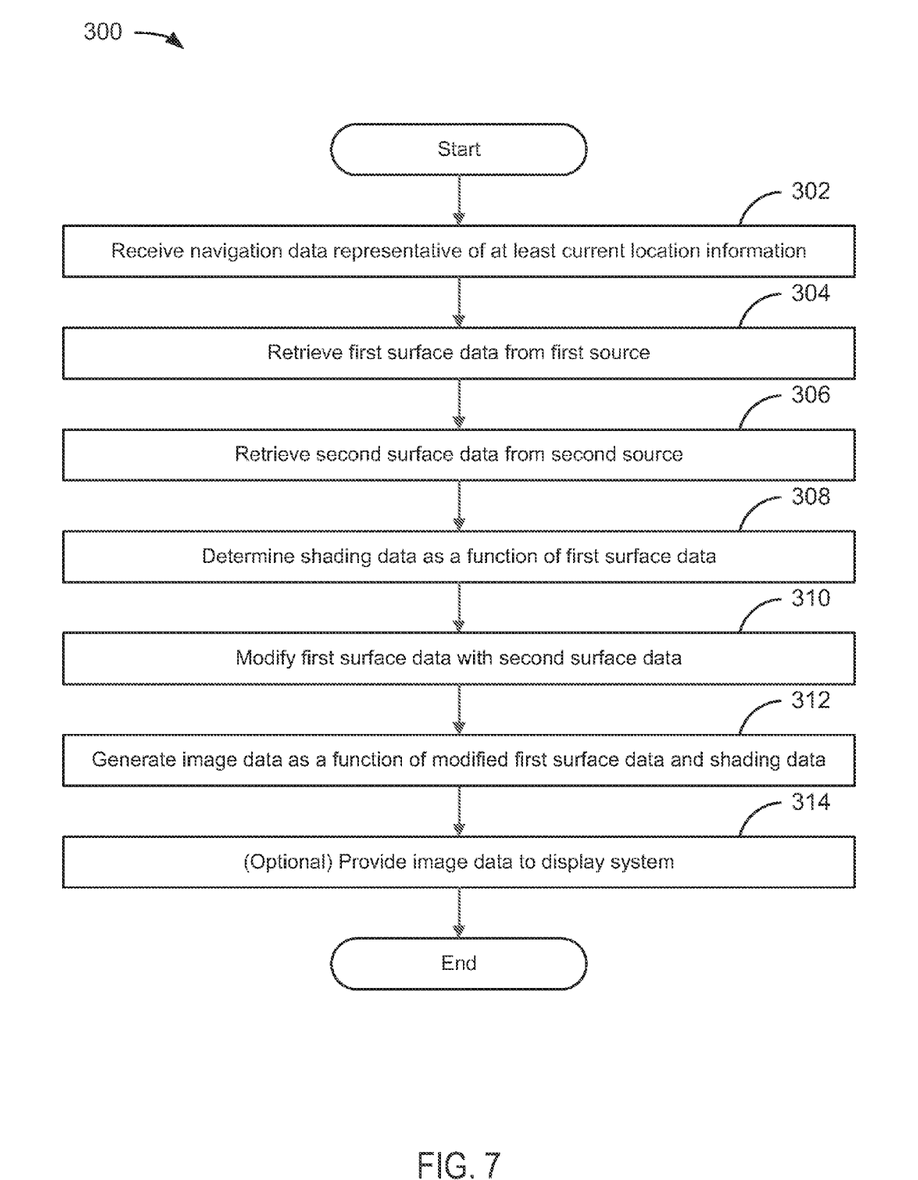
FIG. 7 depicts a flowchart illustrating a method for generating surface data.

FIG. 7 depicts flowchart 300 disclosing an example of a method for terrain scene data, where the IG 140 may be programmed or configured with instructions corresponding to the following modules embodied in flowchart 300. As embodied herein, the IG 140 may be a processor or a combination of processors found in the navigation data source 110, the first surface data source 120, the second surface data source 130, and/or the display system 150. Also, the IG 140 may be a processor of a module such as, but not limited to, a printed circuit card having one or more input interfaces to facilitate the two-way data communications of the IG 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

As shown in FIG. 7, the flowchart begins with module 302 with the receiving of navigation data, where the navigation data could be representative of at least aircraft location information. The flowchart continues with module 304 with the retrieving of first surface data from the first surface data source 120 based upon the navigation data. The first surface data could be comprised of a plurality of elevations (i.e., elevation values) of terrain and/or surface features located within the scene outside the aircraft.

In an event in which the second surface data source 130 provides for surface feature data representative of location and/or elevation information for one or more individual surface features, the data of the first surface data source 120 could be comprised of terrain data and/or surface feature data into which the location and/or elevation information of the second surface data source 130 is factored.

The flowchart continues with module 306 with the retrieving of second surface data from the second surface data source 130 based upon the navigation data. The second surface data could be comprised of at least location and elevation information of one or more reference points for one or more surface feature areas located within the scene outside the aircraft; as embodied herein, a surface feature area could be comprised of an airport or aerodrome. When the second surface data source 130 is comprised of an ARINC 816 database, the location and elevation information could correspond to the following attributes of an "Airport Entry" element for the airport: lat, long, and elev. In an additional embodiment, the second surface data could include values corresponding to boundary information and/or relative to the reference point.

The flowchart continues with module 308 with the determining of shading data as a function of the first surface data. The shading data may be determined by applying a shader algorithm to the first surface data. The shading data may be representative of shading corresponding to the first surface data.

The flowchart continues with module 310 with the modifying of the first surface data as a function of the second surface data. One or more elevations of the plurality of elevations falling within each surface feature area may be set to match the elevation of the reference point represented in the second surface data, where the location of the surface feature area is based upon the location of the reference point represented in the second surface data. In an embodiment in which one or more surface feature areas are comprised of individual surface feature(s) to which elevation and/or location information is provided, the one or more elevations of the plurality of elevations falling within the area of each individual surface feature may be set to match the elevation of each individual surface feature in the second surface data.

In an embodiment in which boundary information is not included in the second surface data, the surface feature area could be comprised of a default, predefined shape encompassing the reference point. In an embodiment in which boundary information is included in the second surface data, the surface feature area could be based boundary information. When the second surface data source 130 is comprised of an ARINC 816 database, the boundary information could be based upon one or more of the following attributes of the "Airport Entry" element for the airport relative to the reference point: minx, miny, maxx, and maxy. In an additional embodiment, the second surface area could include data representative of one or more manmade surface features.

The flowchart continues with module 312 with the generating of image data as a function of the modified first surface data and the shading data, where the image data is representative of a three-dimensional perspective of a scene outside the aircraft comprised of at least one flattened surface feature area, where the shading represented in the shading data is included in the flattened surface feature area. In an additional embodiment, the function could include second surface data representative of one or more manmade and/or natural surface features. In an additional embodiment, the function could include texture data representative of one or more texturing effects applied to the three-dimensional, perspective image inclusive and/or exclusive of the three-dimensional flattened surface feature area. As embodied herein, the first surface data source and the second surface data source could be comprised of the same surface data source.

The flowchart continues with optional module 314 with the providing of the image data to the display system 150 configured to receive the image data. After being received, the image represented in the image data may be presented on a screen of one or more display units of the display system 150. Then, flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating surface data, such system comprising:
   a source of navigation data;
   a source of first surface data;
   a source of second surface data; and
   an image generator configured to:
      receive navigation data representative of at least location information;
      retrieve first surface data based upon the navigation data, where
         the first surface data is representative of a plurality of elevations;
      retrieve second surface data of at least one surface feature area based upon the navigation data, where
         for each surface feature area, the second surface data is representative of one location and one elevation of one reference point used for defining the surface feature area within which at least one surface feature is defined;
      determine shading data as a function of the first surface data, where
         the shading data is representative of shading applicable to the plurality of elevations;

modify the first surface data as a function of the second surface data, where
for each surface feature area, the plurality of elevations represented in the first surface data and located within the surface feature area is replaced by the one elevation for the surface feature area represented in the second surface data; and
generate image data as a function of the modified first surface data and the shading data, whereby
the image data is representative of an image comprised of at least one flat and even surface defined by the one elevation to which the shading applicable to the plurality of elevations is applied to the one elevation of each flat and even surface.

2. The system of claim 1, wherein
the navigation data is comprised of aircraft navigation data, and
at least one reference point corresponds to an airport or aerodrome.

3. The system of claim 1, wherein
the source of second surface data is comprised of an ARINC 816 database or an ARINC 424 database, or
the source of first surface data and the source of second surface data are comprised of the same source of data.

4. The system of claim 1, wherein the function for generating the image data includes texture data representative of at least one texturing effect.

5. The system of claim 1, wherein the second surface data is further representative of boundary information of at least one surface feature area.

6. The system of claim 1, wherein
the second surface data is further representative of dimensions and locations of at least one surface feature located within at least one surface feature area, and
the function for generating the image data includes the second surface data.

7. The system of claim 1, further comprising:
a display system configured to
receive the image data from the image generator, where
the image generator is further configured to provide the image data to the display system, whereby
the image represented in the image data is presented to the viewer.

8. A device for generating surface data, such device comprising:
an image generator configured to:
receive navigation data representative of at least location information;
retrieve first surface data based upon the navigation data, where
the first surface data is representative of a plurality of elevations;
retrieve second surface data of at least one surface feature area based upon the navigation data, where
for each surface feature area, the second surface data is representative of one location and one elevation of one reference point used for defining the surface feature area within which at least one surface feature is defined;
determine shading data as a function of the first surface data, where
the shading data is representative of shading applicable to the plurality of elevations;
modify the first surface data as a function of the second surface data, where
for each surface feature area, the plurality of elevations represented in the first surface data and located within the surface feature area is replaced by the one elevation for the surface feature area represented in the second surface data; and
generate image data as a function of the modified first surface data and the shading data, whereby
the image data is representative of an image comprised of at least one flat and even surface defined by the one elevation to which the shading applicable to the plurality of elevations is applied to the one elevation of each flat and even surface.

9. The device of claim 8, wherein
the navigation data is comprised of aircraft navigation data, and
at least one reference point corresponds to an airport or aerodrome.

10. The device of claim 8, wherein the function for generating the image data includes texture data representative of at least one texturing effect.

11. The device of claim 8, wherein the second surface data is further representative of boundary information of at least one surface feature area.

12. The device of claim 8, wherein
the second surface data is further representative of dimensions and locations of at least one surface feature located within at least one surface feature area, and
the function for generating the image data includes the second surface data.

13. The device of claim 8, wherein
the image generator is further configured to
provide the image data to a display system, whereby
the image represented in the image data is presented to the viewer.

14. A method for generating surface data, such method comprising:
receiving navigation data representative of at least location information;
retrieving first surface data based upon the navigation data, where
the first surface data is representative of a plurality of elevations;
retrieving second surface data of at least one surface feature area based upon the navigation data, where
for each surface feature area, the second surface data is representative of at one location and one elevation of one reference point used for defining the surface feature area within which at least one surface feature is defined;
determining shading data as a function of the first surface data, where
the shading data is representative of shading applicable to the plurality of elevations;
modifying the first surface data as a function of the second surface data, where
for each surface feature area, the plurality of elevations represented in the first surface data and located within the surface feature area is replaced by the one elevation for the surface feature area represented in the second surface data; and
generating image data as a function of the modified first surface data and the shading data, whereby
the image data is representative of an image comprised of at least one flat and even surface defined by the one elevation to which the shading applicable to the plurality of elevations is applied to the one elevation of each flat and even surface.

15. The method of claim 14, wherein
the navigation data is comprised of aircraft navigation data, and
at least one reference point corresponds to an airport or aerodrome.

16. The method of claim 14, wherein the function for generating the image data includes texture data representative of at least one texturing effect.

17. The method of claim 14, wherein the second surface data is further representative of boundary information of at least one surface feature area.

18. The method of claim 14, wherein
the second surface data is further representative of dimensions and locations of at least one surface feature located within at least one surface feature area, and
the function for generating the image data includes the second surface data.

19. The method of claim 14, further comprising:
providing the image data to a display system, whereby
the image represented in the image data is presented to the viewer.

* * * * *